United States Patent [19]
Robbins

[11] Patent Number: 6,055,583
[45] Date of Patent: Apr. 25, 2000

[54] DMA CONTROLLER WITH SEMAPHORE COMMUNICATION PROTOCOL

[75] Inventor: Daniel C. Robbins, Durham, N.C.

[73] Assignee: Mitsubishi Semiconductor America, Inc., Durham, N.C.

[21] Appl. No.: 08/828,780

[22] Filed: Mar. 27, 1997

[51] Int. Cl.[7] .................................................. G06F 12/00
[52] U.S. Cl. ............................................................ 710/22
[58] Field of Search .......................... 364/900; 395/275, 395/325, 425, 427, 842, 845, 847, 848, 725, 200; 370/24, 431; 371/30; 710/22, 24, 26

[56] References Cited

U.S. PATENT DOCUMENTS

| 4,723,223 | 2/1988 | Hanada | 364/900 |
|---|---|---|---|
| 5,119,480 | 6/1992 | Garcia, Jr. et al. | 395/325 |
| 5,185,877 | 2/1993 | Bissett et al. | 395/425 |
| 5,191,649 | 3/1993 | Cadambi et al. | 395/200 |
| 5,222,213 | 6/1993 | Petty | 395/164 |
| 5,251,303 | 10/1993 | Fogg, Jr. et al. | 395/275 |
| 5,261,109 | 11/1993 | Cadambi et al. | 395/725 |
| 5,271,020 | 12/1993 | Marisetty | 371/30 |
| 5,282,272 | 1/1994 | Guy et al. | 395/275 |
| 5,301,186 | 4/1994 | Galuszka et al. | 370/24 |
| 5,305,437 | 4/1994 | Fritze et al. | 395/162 |
| 5,325,489 | 6/1994 | Mitsuhira et al. | 395/275 |
| 5,398,324 | 3/1995 | Matida et al. | 395/425 |
| 5,404,536 | 4/1995 | Ramakrishnan et al. | 395/725 |
| 5,471,672 | 11/1995 | Reddy et al. | 395/296 |
| 5,519,693 | 5/1996 | Galuszka et al. | 370/24 |
| 5,548,786 | 8/1996 | Amini et al. | 395/842 |
| 5,557,733 | 9/1996 | Hicok et al. | 395/162 |
| 5,561,819 | 10/1996 | Gephardt et al. | 395/847 |
| 5,561,820 | 10/1996 | Bland et al. | 395/847 |
| 5,561,821 | 10/1996 | Gephardt et al. | 395/848 |
| 5,590,377 | 12/1996 | Smith | 395/842 |
| 5,613,162 | 3/1997 | Kabenjian | 395/842 |
| 5,619,728 | 4/1997 | Jones et al. | 395/847 |
| 5,623,622 | 4/1997 | Yuki et al. | 395/427 |
| 5,655,151 | 8/1997 | Bowers et al. | 395/842 |
| 5,671,443 | 9/1997 | Stauffer et al. | 395/845 |
| 5,699,361 | 12/1997 | Ding et al. | 370/431 |
| 5,724,609 | 3/1998 | Hatae et al. | 395/842 |
| 5,729,762 | 3/1998 | Kardach et al. | 395/842 |
| 5,752,081 | 5/1998 | Jirgal | 395/842 |
| 5,761,532 | 6/1998 | Yarch et al. | 395/842 |
| 5,774,743 | 6/1998 | Story et al. | 395/842 |
| 5,774,744 | 6/1998 | Story et al. | 395/847 |
| 5,812,876 | 9/1998 | Welker et al. | 710/22 |

*Primary Examiner*—Joseph E. Palys
*Assistant Examiner*—Nguyêñ Xuân Nguyên
*Attorney, Agent, or Firm*—McDermott, Will & Emery

[57] ABSTRACT

A device driver initiates a DMA transfer and repeatedly reads a semaphore from a specified location in system memory. Upon completion of a DMA transfer, a DMA controller writes a semaphore containing status information to the specified location in system memory, informing the device driver that the DMA transfer is completed. A cache memory for the specified location in system memory is provided to further reduce the latency between DMA transfers.

15 Claims, 6 Drawing Sheets

DMA CONTROLLER WITH SEMAPHORE COMMUNICATION PROTOCOL

TECHNICAL FIELD

The invention relates generally to computer systems and more particularly to DMA controllers.

BACKGROUND ART

Figure 1:
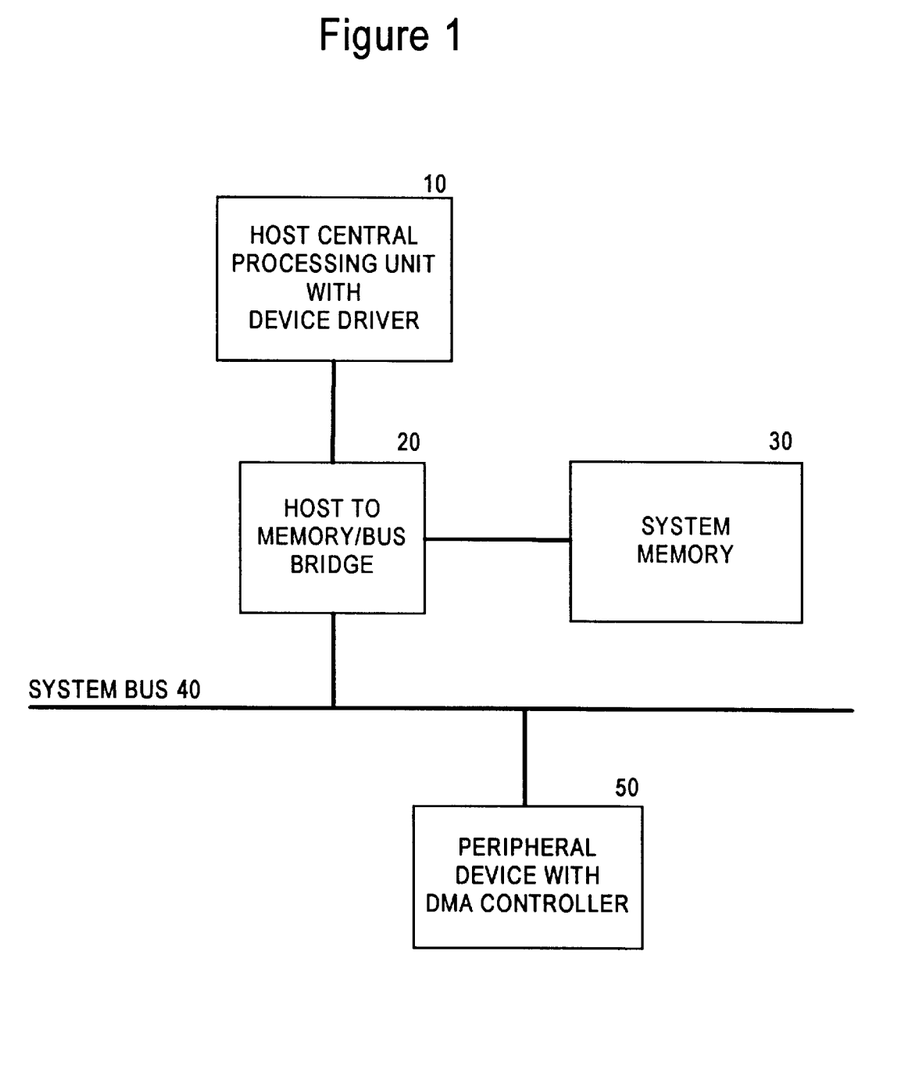
FIG. 1 is a high-level block diagram of a computer system according to an embodiment of the invention.

A direct memory access (DMA) controller is an apparatus which transfers a specified amount of data between a peripheral device, such as a hard disk or video card, and the system memory of a computer system in response to a "transmit" command. Referring to FIG. 1, a computer system comprises host central processing unit (CPU) 10, host to bus/memory bridge 20, system memory 30, system bus 40, and peripheral device 50. System bus 40 couples peripheral device 50 to bridge 20, and bridge 20 couples host CPU 10 to system memory 30 and system bus 40.

To initiate a DMA operation, a device driver, executing on host CPU 10, sets up a control/data list in system memory 30, specifying the data to be transferred and optional control information. After setting up the control/data list, the device writes information about the memory location of the control/data list in registers of the DMA controller and a transmit command as a control signal through bridge 20 and system bus 40 to the DMA controller of peripheral device 50. In response to the control signal, the DMA controller reads the control/data list in system memory 30 and begins the DMA transfer.

If the peripheral device is a graphics processing subsystem, an associated graphics device driver commonly initiates a series of DMA transfers. In order to start the next DMA transfer, the graphics device driver must be informed when the DMA transfer is completed. As a result, a high-performance graphics device needs to reduce the latency between the end of one DMA transfer and the beginning of the next DMA transfer as much as possible.

A conventional method to inform a device driver that a DMA transfer is completed is the interrupt method. After the DMA transfer is complete, the DMA controller sends a special, asynchronous signal with the system bus to an interrupt controller sitting on system bus 40 (not shown). In response, the interrupt controller signals host CPU 10, which causes host CPU 10 to perform a context swap, save state information, and execute reads to the interrupt controller using special cycles to determine an interrupt vector.

Host CPU 10 uses the interrupt vector to jump to an interrupt handler. The interrupt handler informs the device driver typically by setting a flag in system memory which the device driver is repeatedly checking. After the flag is set, the interrupt handler terminates and control of the host CPU is restored to the device driver through another context swap. A major disadvantage of the interrupt method, however, is that executing all the operations in the interrupt method is expensive, taking many microseconds to perform. In a computer system with high-performance graphics processing, such a performance penalty is a substantial drawback.

In another conventional method, the polling method, the device driver repeatedly reads a status register on the peripheral device to determine if the DMA operation has completed. Although the polling method theoretically promises a quicker determination that the DMA transfer is completed, the repeated reads of the status register of the peripheral device interfere with efficient operation of many standard system buses, such as PCI or AGP buses.

Such standard system bus architectures are specifically designed with pipelines and buffers to process a large amount of data within a very short amount of time. When the device driver reads the status register through the system bus, the system bus must flush its write buffers to the destination and invalidate its read buffers, impairing the performance of the ongoing DMA transfer.

Other conventional methods employ specialized hardware which bypasses the standard system bus to achieve superior performance. However, such specialized hardware increases the cost of computer systems.

Therefore, there is a need for a high-performance DMA communications protocol using a standard system bus.

DISCLOSURE OF THE INVENTION

In accordance with the present invention, a computer system comprises a system memory, a system bus, a DMA controller, and device driver means. The system bus couples the DMA controller to the system memory and the device driver means. The system memory is also coupled to the device driver means.

The DMA controller is configured to transfer data between a device and the system memory in response to a control signal and to write a semaphore to the system memory. The device driver means is configured to send the control signal to the DMA controller, read the semaphore from the system memory and detect a change in the semaphore.

According to another aspect of the invention, a computer system further comprises a cache memory and a bridge. The bridge couples the system bus, the device driver means, the cache memory, and the system memory to each other.

The bridge is configured to detect a reading of the semaphore from system memory and, in response, read the semaphore from the cache memory. In addition, the bridge is configured to detect a writing of the semaphore to system memory and, in response, write the semaphore to the cache memory.

According to another aspect of the invention, a DMA controller comprises means for performing a DMA transfer of memory values between the system memory and itself, in response to a control signal. In addition, the DMA controller has means for writing a semaphore, indicating a completion of a DMA transfer, to the system memory through the system bus after the DMA transfer is complete.

According to still another aspect of the invention, a method of transferring data between a device and a system memory comprises the step of causing a device to send a control signal to a DMA controller, to read a semaphore from the system memory, and to detect a change in the semaphore. The method also comprises the step of causing the DMA controller to transfer the data between the device and the system memory in response to the control signal and to write the semaphore to the system memory.

In another aspect, a reading of the semaphore from system memory is detected, and, in response, the semaphore is read from a cache memory. Furthermore, the semaphore is written to the cache memory in response to detecting a writing of the semaphore to the system memory.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various and obvious respects, all without departing from the invention. Accordingly, the drawing and description are to be regarded as illustrative in nature, and not as restrictive.

BRIEF DESCRIPTION OF DRAWINGS

The present invention is illustrated by way of example, and not by way of limitation, in the figures of the accompanying drawings and in which like reference numerals refer to similar elements and in which.

BEST MODE FOR CARRYING OUT THE INVENTION

A system and method for performing a DMA transfer of specified data is described. In the following description, for purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Referring to FIG. 1, a computer system according to an embodiment of the invention comprises host CPU 10, host to memory/bus bridge 20, system memory 30, system bus 40, and peripheral device 50. Bridge 20 is coupled to host CPU 10, system memory 30, and system bus 40. Peripheral device 50 is coupled to system bus 40.

A device driver, executing on host CPU 10, communicates with a DMA controller of peripheral device 50 to initiate a direct-memory access (DMA) transfer of memory blocks between system memory 30 and peripheral device 50. The DMA transfer is executed by the DMA controller of peripheral device 50, allowing host CPU 10 to perform other tasks. When peripheral device 50 is a video card or other high-performance computer graphics device, the device driver initiates a series of DMA transfers to transfer blocks of memory describing an image to the video card.

In an embodiment of the invention, the device driver uses system memory 30 as a communication channel with the DMA controller to determine when one DMA transfer is complete so that the device driver can initiate another DMA transfer as quickly as possible. More specifically, the DMA controller writes a semaphore to a location in system memory 30 upon completion of the DMA transfer.

A semaphore indicates status information about the DMA transfer. A semaphore has at least two states or, in other words, has at least two different values depending on the status information. During the DMA transfer, the semaphore has one value indicating that the DMA transfer is on-going. After the DMA transfer, the semaphore has another value indicating that the DMA transfer is complete.

The precise value of a semaphore will vary from implementation to implementation, and, even on the same computer system, different DMA controllers for peripheral devices may employ different values. A variety of techniques of assigning semaphore values are well-known in the art. However, a computer system according an embodiment of the invention does not rely on the precise value of the semaphore, but upon the fact that the value of the semaphore changes.

In a preferred embodiment, the semaphore is a 32-bit word, with one bit of the 32-bit word allocated for indicating DMA completion. Changes in that one bit are detected through standard bitwise operations. Other bits in the semaphore may be allocated to indicate the existence and type of an error or other status information specific to the peripheral device. By using the semaphore for multiple purposes as a communications channel, the device driver can avoid having to access the DMA controller directly during a DMA transfer.

Figure 2:
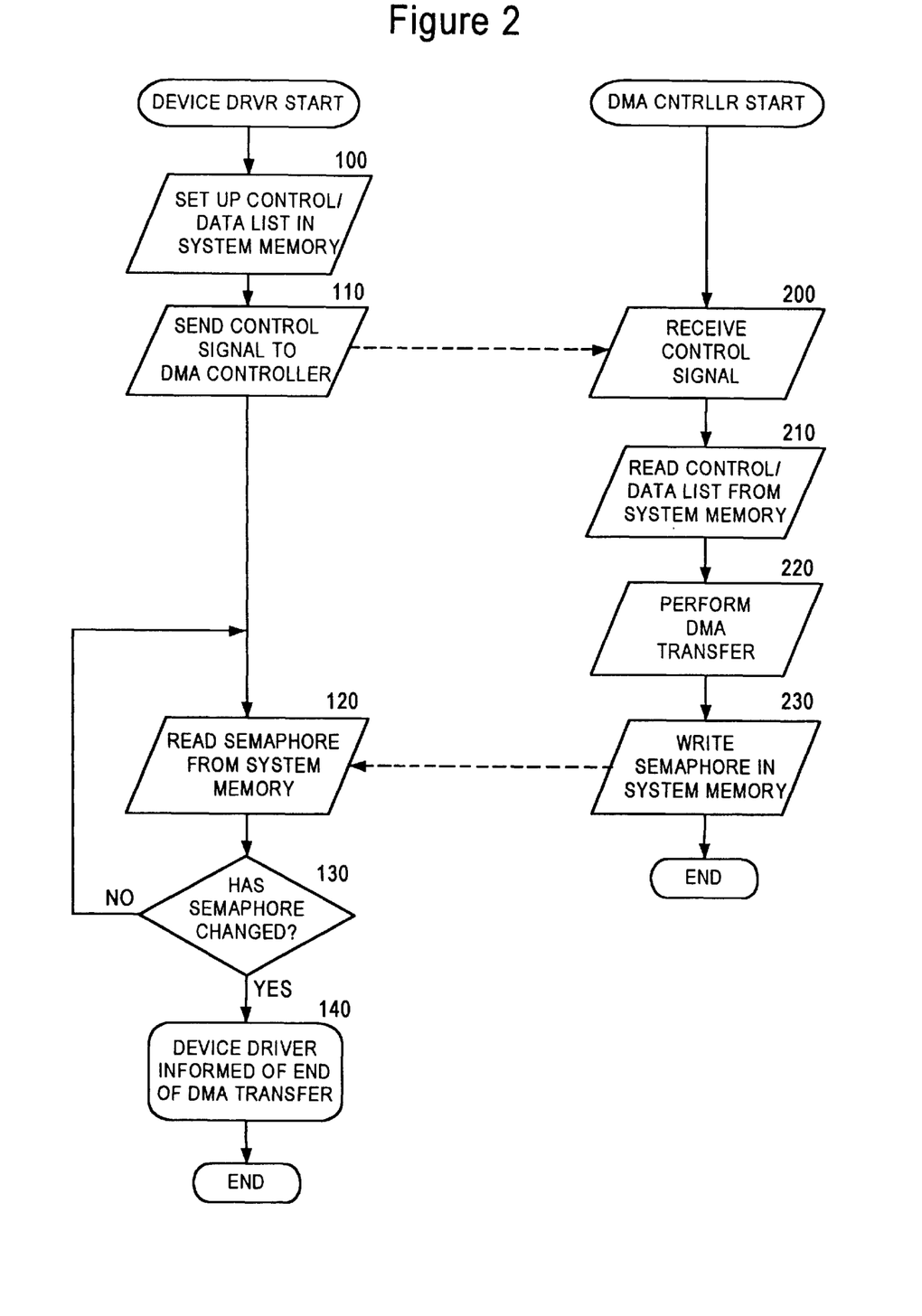
FIG. 2 is a flow diagram of operations of an embodiment of the invention.

An operation of the semaphore communications protocol is shown in FIG. 2. When the device driver begins to initiate a DMA transfer, the device driver sets up a control/data list in system memory (step 100) with data the DMA transfer to be performed by the DMA controller. In the next step, the device driver writes control information and a transmit command as a control signal to the DMA controller through the system bus to start the DMA transfer (step 110). The control information indicates the memory location of the control/data list and the memory location of a semaphore.

After the control signal is sent, the device driver repeatedly reads the semaphore from the specified location in system memory (step 120) and checks the semaphore value (step 130). If the semaphore value has not changed, then the execution of the device driver proceeds back to step 120, where the device driver reads from the specified memory location again. On the other hand, if the semaphore value has changed, then this fact notifies the device driver that the DMA transfer has completed, signifying that the DMA controller is ready for another DMA transfer (step 140).

After the DMA controller receives the control signal in step 200 generated by the device driver in step 110 and sent through system bus 40, the DMA controller executes steps 210 through 230 simultaneously in parallel with the execution of steps 120 and 130 of the device driver. In response to receiving the control signal from the device driver, the DMA controller reads the control/data list from system memory (step 210). In the next step (220), the DMA controller performs the DMA transfer according to the data contained in the control/data list. Upon completion of the DMA transfer, the DMA controller writes a semaphore containing status information to the specified location in system memory (step 230).

In this manner, the time required for the context switches and device signalling of the interrupt method is avoided, because the DMA controller does not send an interrupt signal to an interrupt controller or the host CPU executing the device driver. Instead, the DMA controller writes the semaphore directly to memory. In contrast to the polling method, the device driver does not use the system bus for checking for the completion of the DMA transfer, because the normal channel between the host CPU and the system memory does not use the system bus. As a result, the device driver does not interfere with the throughput of the system bus during the DMA transfer operation.

Figure 3:
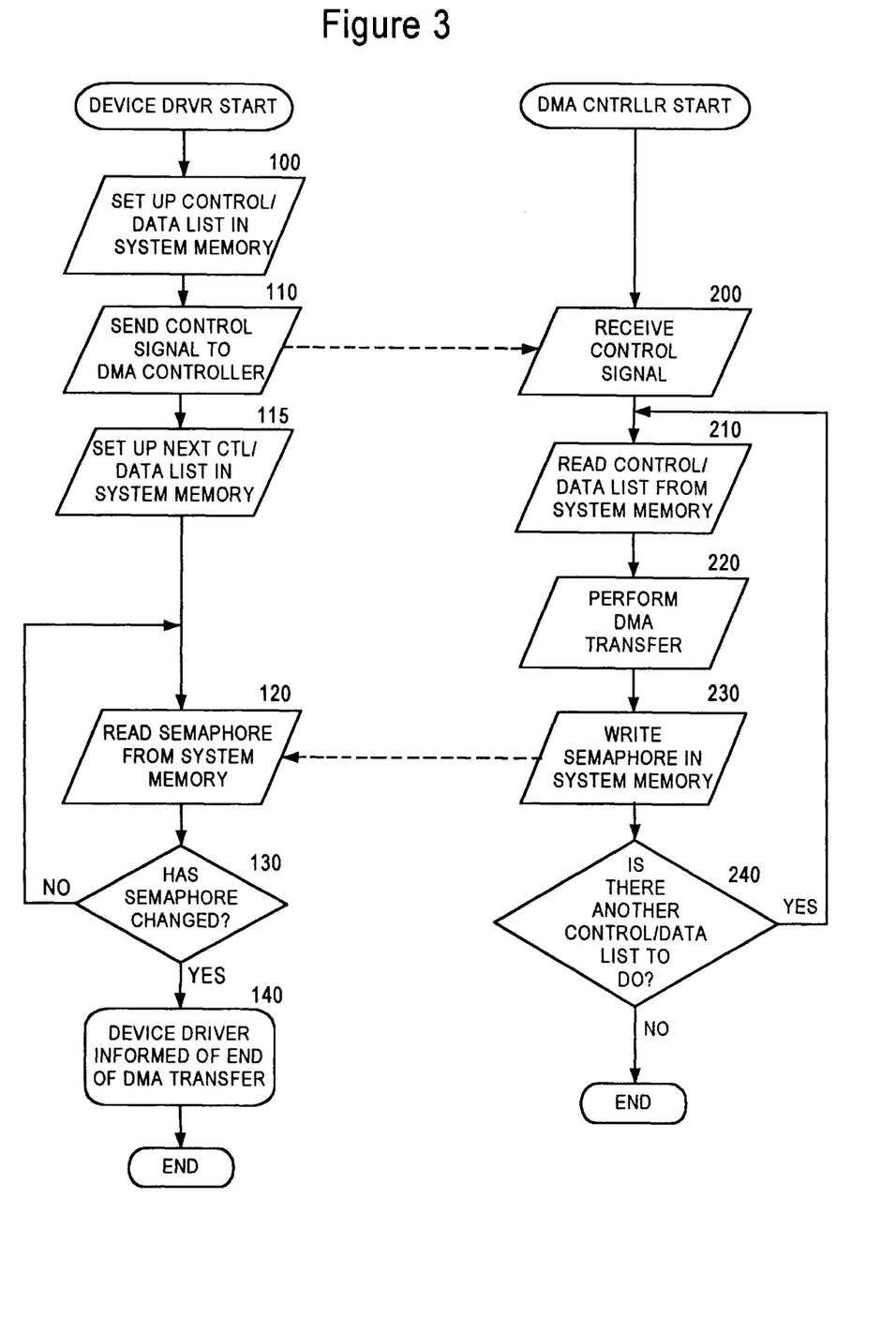
FIG. 3 is a flow diagram of operations of another aspect of an embodiment of the invention.

In another aspect of the embodiment of the invention, the device driver sets up a linked list of control/data lists specifying a series of DMA transfers. Referring to FIG. 3, the device driver in step 100 sets up a control/data list with data for the first DMA transfer and control information for the next DMA transfer. In step 110, the device driver sends control information about the first DMA transfer and a transmit command as a control signal through bridge 20 and system bus 40.

After the step of sending the control signal to the DMA controller (step 110) is executed, the device driver sets up linked control/data lists for the next DMA transfers (step 115). While the control/data lists are set up, the device driver checks the semaphore for each DMA transfer (step 120). By detecting changes in the each semaphore (step 130), the device driver is informed of status and error conditions and, ultimately, the completion of the entire chain of DMA transfers (step 140).

Meanwhile, the DMA controller, in response to receiving the control signal (step 200), reads the control/data list from system memory according to control information sent as part of the control signal (step 210) and performs the DMA transfer (step 220). After that DMA transfer is complete, the DMA controller writes the semaphore into system memory (step 230).

In this linked list DMA approach, the control/data list read by the DMA controller in step 210 also includes control information about the next DMA transfer. The control information specifies whether there is another DMA transfer in the linked list, the source memory address for the data, the destination memory address for the data, the amount of data to be transferred, and a location in system memory for a semaphore associated with that next DMA transfer. In a preferred embodiment, the control information is located immediately after the data to be transferred so that the DMA controller can read the control information along with the transfer data in a burst read.

If there is another control/data list in the chain of DMA transfers (step 240), the DMA controller returns to step 210 to read the next control/data list. In this manner, the control/data list for a next DMA transfer is ready for immediate use by the DMA controller after the completion of a first DMA transfer, further reducing the latency between DMA transfers.

Figure 4:
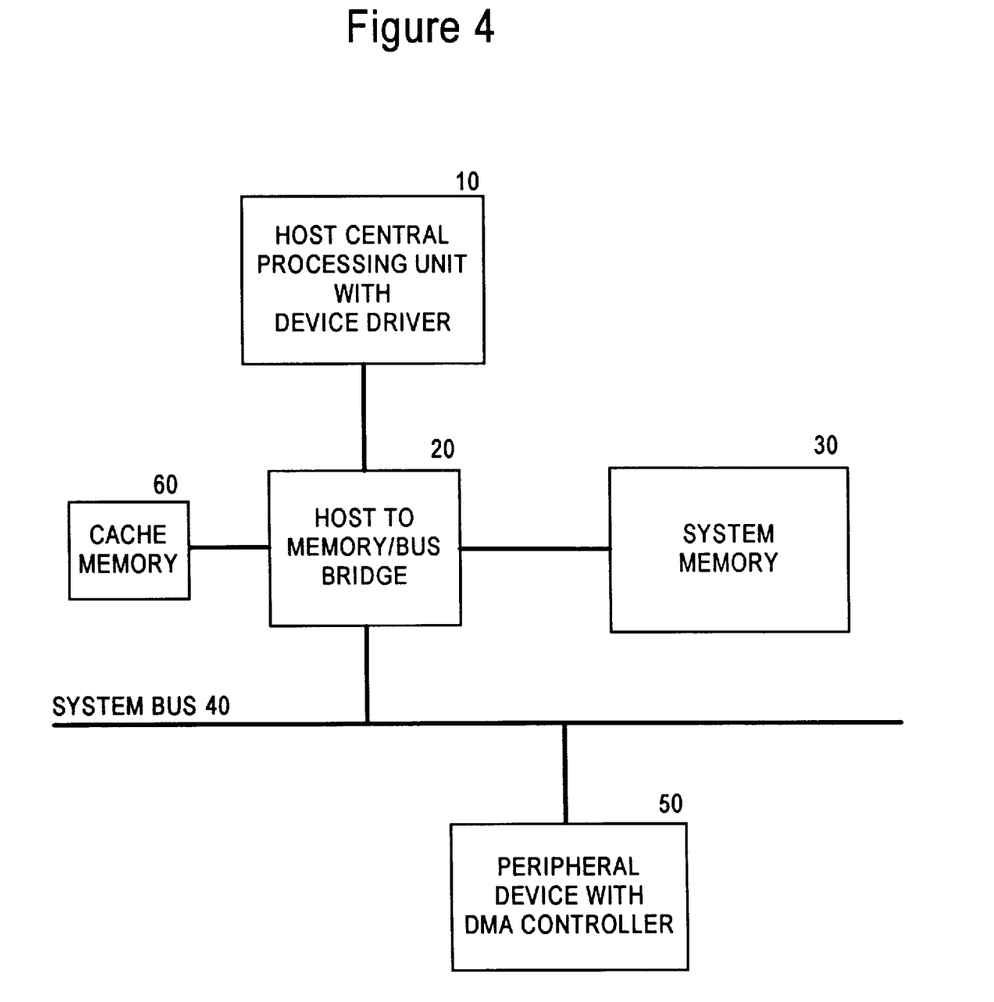
FIG. 4 is a high-level block diagram of a computer system according to another embodiment of the invention.

With reference to FIG. 4, a computer system of another embodiment of the invention maintains a system memory cache (cache memory 60) for system memory 30, and the location of the semaphore in system memory 30 is configured to be in a cacheable portion of system memory 30. A cache memory is a high-speed memory commonly employed to reduce time taken for host CPU 10 to access system memory 30 by storing a copy of data stored in system memory 30.

Accordingly, bridge 20 is configured, by techniques well-known in the art of cache memories, to check and update cache memory 60 when there is an access to the cacheable portion of system memory 20. Thus, when host CPU 10 performs a memory read operation from a location in system memory 30, bridge 20 checks to see if that location is cached in cache memory 60. If the location is cached, a condition called a "cache hit," bridge 20 retrieves the value for that location from the higher speed cache memory. On the other hand, if there is a "cache miss," bridge 20 fetches the value from system memory 30 for host CPU and stores that value in cache memory 60 for a future memory request. Moreover, if bridge 20 detects a write to a cacheable system memory location, bridge 20 ensures that cache memory 60 is accordingly updated.

The operation of a cache memory is transparent to the host CPU 10 and peripheral device 50. As a result, the same implementation of the device driver and the DMA controller may be used for this embodiment of the invention without modification.

Figure 5:
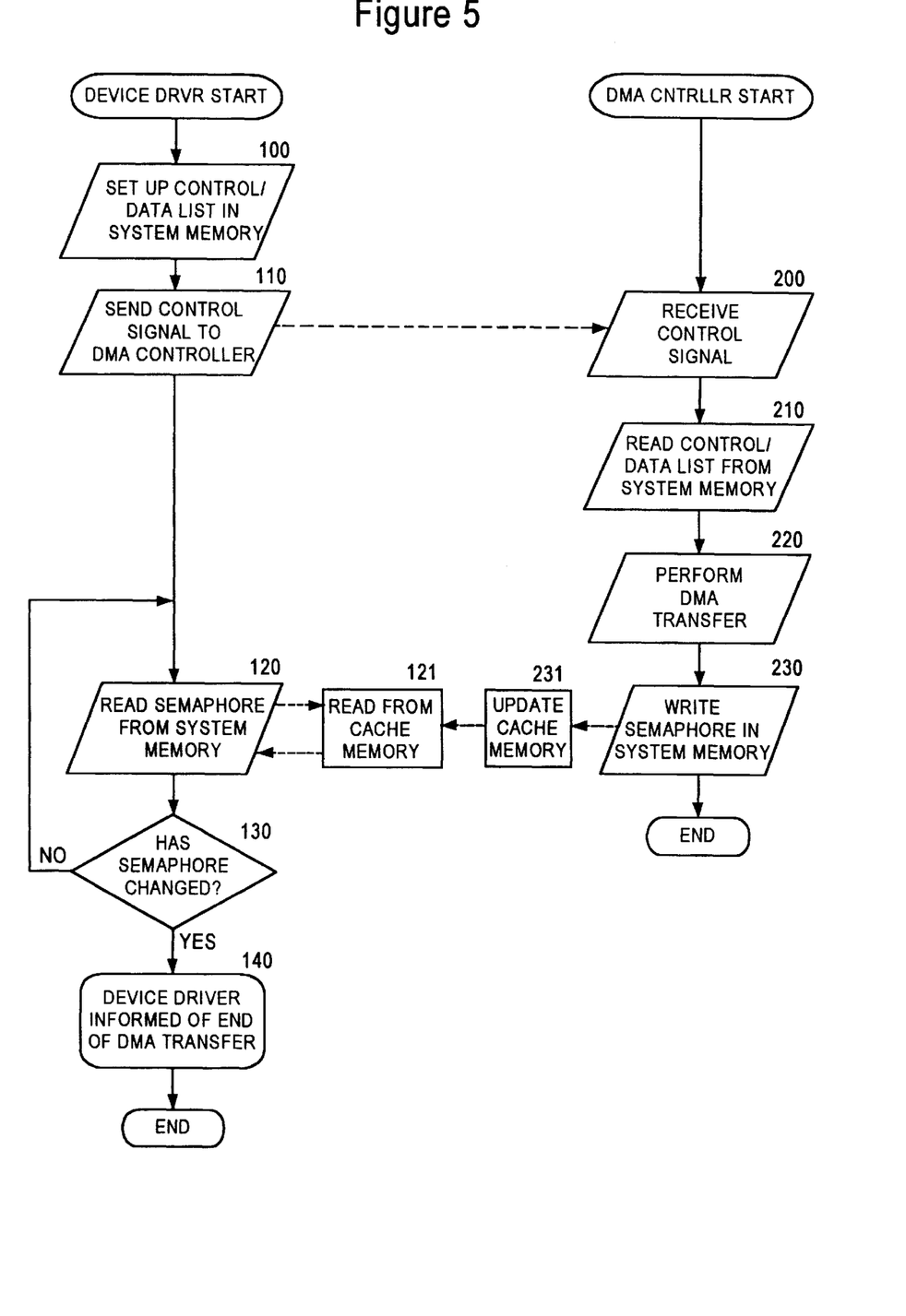
FIG. 5 is a flow diagram of operations of another embodiment of the invention.

The operation of this embodiment of the invention is shown in FIG. 5 and is similar to the operation of an embodiment of the invention shown in FIG. 2, except for the addition of steps 121 and 231. When the device driver reads the semaphore from the system memory (step 120), a cache entry for the specified memory location is checked first (step 121). Thus, the read request may be serviced from the system memory cache, allowing each repeated read to be executed very quickly, even in one host CPU clock cycle.

When the DMA controller writes a semaphore to the specific system memory location (step 230), the corresponding cache entry is updated (step 231). As a result, the next memory read by the device driver will yield a cache hit and return the written semaphore (step 121), reducing the latency between DMA transfers.

Figure 6:
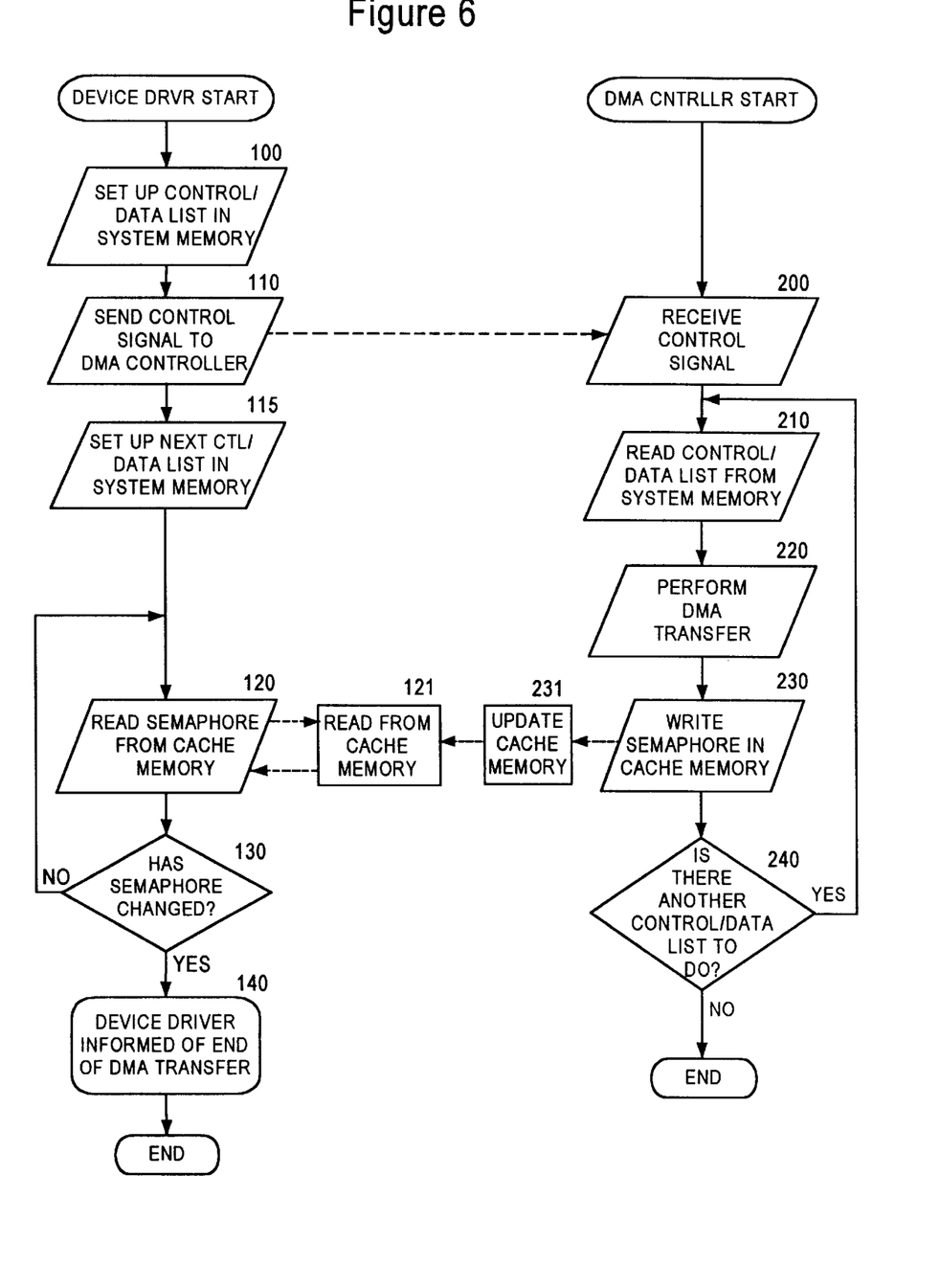
FIG. 6 is a flow diagram of operations of another aspect of the invention.

In another aspect of this embodiment, shown in FIG. 6, the device driver sets up the next control/data lists in system memory for the next DMA transfer (step 115), before reading the semaphore from cached system memory (step 120). In this manner, the step to set up the next DMA transfers is executed in parallel with the current DMA transfer, further reducing the latency between DMA transfers. The remainder of the process is the same as depicted in FIG. 3.

In this disclosure there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A computer system, comprising:

a system memory;

a system bus coupled to said system memory;

a DMA controller coupled to said system bus and configured for transferring data between a device and said system memory through said system bus in response to a control signal initiating a DMA transfer and writing a semaphore to said system memory indicating a completion of the DMA transfer; and a device driver coupled to said system memory and to said system bus and configured for sending the control signal to said DMA controller through said system bus, reading a semaphore from the system memory, and detecting any change in the semaphore.

2. The computer system of claim 1, wherein:

said device driver is configured for repeatedly reading the semaphore after signaling said DMA controller; and said DMA controller is configured for writing the semaphore after transferring the data.

3. The computer system of claim 1, wherein:

said device driver is configured to set up a first control/data list in said system memory before sending the control signal to said DMA controller and to set up a second control/data list, distinct from the first control/data list, in said system memory after sending the control signal to said DMA controller and before detecting a change in the semaphore.

4. The computer system of claim 1, further comprising:

a cache memory; and a bridge coupled to said system memory, said cache memory, said device driver and said DMA controller, and configured for detecting a reading of the semaphore from said system memory and detecting a writing of the semaphore to said system memory, wherein:

said bridge is configured for reading the semaphore from said cache memory in response to detecting a reading of the semaphore from said system memory; and said bridge is further configured for writing the semaphore to said cache memory in response to detecting a writing of the semaphore to said system memory.

5. The computer system of claim 4, wherein:

said device driver is configured for repeatedly reading the semaphore from said system memory through said bridge after signaling said DMA controller; and said DMA controller is configured for writing the semaphore to system cache memory through said bridge after transferring the data.

6. The computer system of claim 4, wherein:

said device driver is configured to set up a first control/data list in said system memory before sending the control signal to said DMA controller and to set up a second control/data list, distinct from the first control/data list, in said system memory after sending the control signal to said DMA controller and before detecting the change in the semaphore.

7. The computer system of claim 1, wherein the DMA controller is configured for writing the semaphore to said system memory through said system bus.

8. A DMA controller, coupled to a system bus, comprising:

means for performing a DMA transfer of memory values between the system memory and said DMA controller in response to a control signal; and means for writing a semaphore, indicating a completion of the DMA transfer, to the system memory through said system bus after the DMA transfer is complete.

9. A method of transferring data between a device and a system memory in a computer system having a device driver and a DMA controller, comprising the steps of:

at the device driver, sending a control signal initiating a DMA transfer to the DMA controller, reading a semaphore from the system memory, and detecting a change in the semaphore indicating a completion of the DMA transfer; and at the DMA controller, transferring the data between the device and the system memory in response to the control signal and writing the semaphore to the system memory.

10. The method of claim 8, wherein:

the step of reading a semaphore further comprises the step of repeatedly reading the semaphore from the system memory after sending the control signal; and the step of writing the semaphore further comprises the step of writing the semaphore to the system memory after transferring the data.

11. The method of claim 8, further comprising the steps of:

at said device driver, setting up a first control/data list in said system memory before sending the control signal to said DMA controller; and setting up a second control/data list, distinct from the first control/data list, in said system memory after sending the control signal to said DMA controller and before detecting the change in the semaphore.

12. The method of claim 8, further comprising the steps of:

detecting a reading of the semaphore from said system memory;

reading the semaphore from a cache memory in response to detecting the reading of the semaphore from said system memory;

detecting a writing of the semaphore to said system memory; and writing the semaphore to said cache memory in response to detecting the writing of the semaphore to said system memory.

13. The method of claim 12, wherein:

the step of reading a semaphore further comprises the step of repeatedly reading the semaphore from the system memory after sending the control signal; and the step of writing the semaphore further comprises the step of writing the semaphore to the system memory after transferring the data.

14. The method of claim 12, further comprising the steps of:

at said device driver, setting up a first control/data list in said system memory before sending the control signal to said DMA controller; and setting up a second control/data list, distinct from the first control/data list, in said system memory after sending the control signal to said DMA controller and before detecting the change in the semaphore.

15. The method of claim 8, wherein the step of writing the semaphore to the system memory includes the step of writing the semaphore to the system memory through a system bus.

* * * * *